Figure 1:
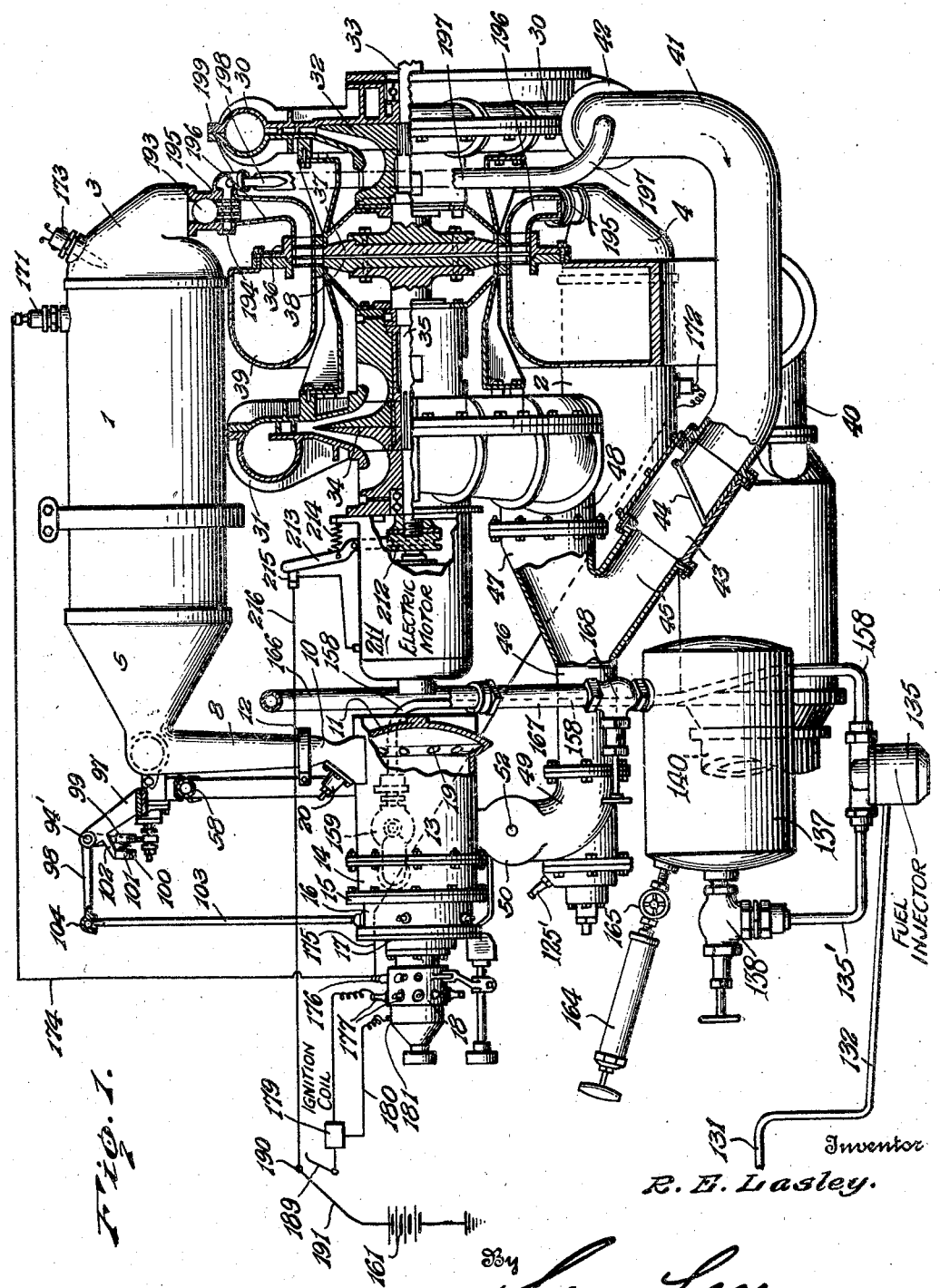

Feb. 17, 1942.    R. E. LASLEY    2,273,406
POWER PLANT
Filed Dec. 15, 1938    5 Sheets-Sheet 1

Inventor
R. E. Lasley.
By Lacey & Lacey,
Attorneys

Fig. 2.

Fuel Injector

Inventor
R. E. Lasley.

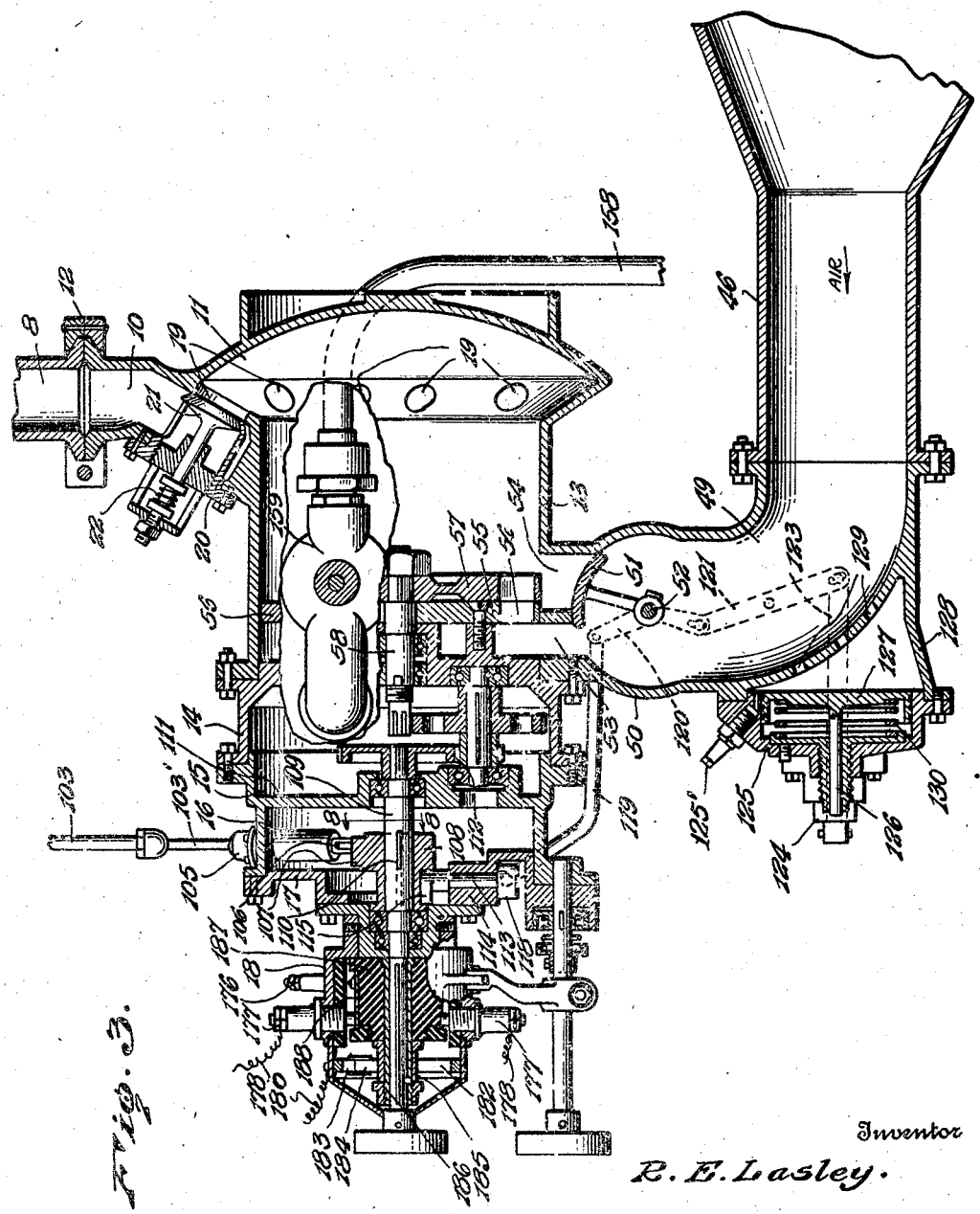

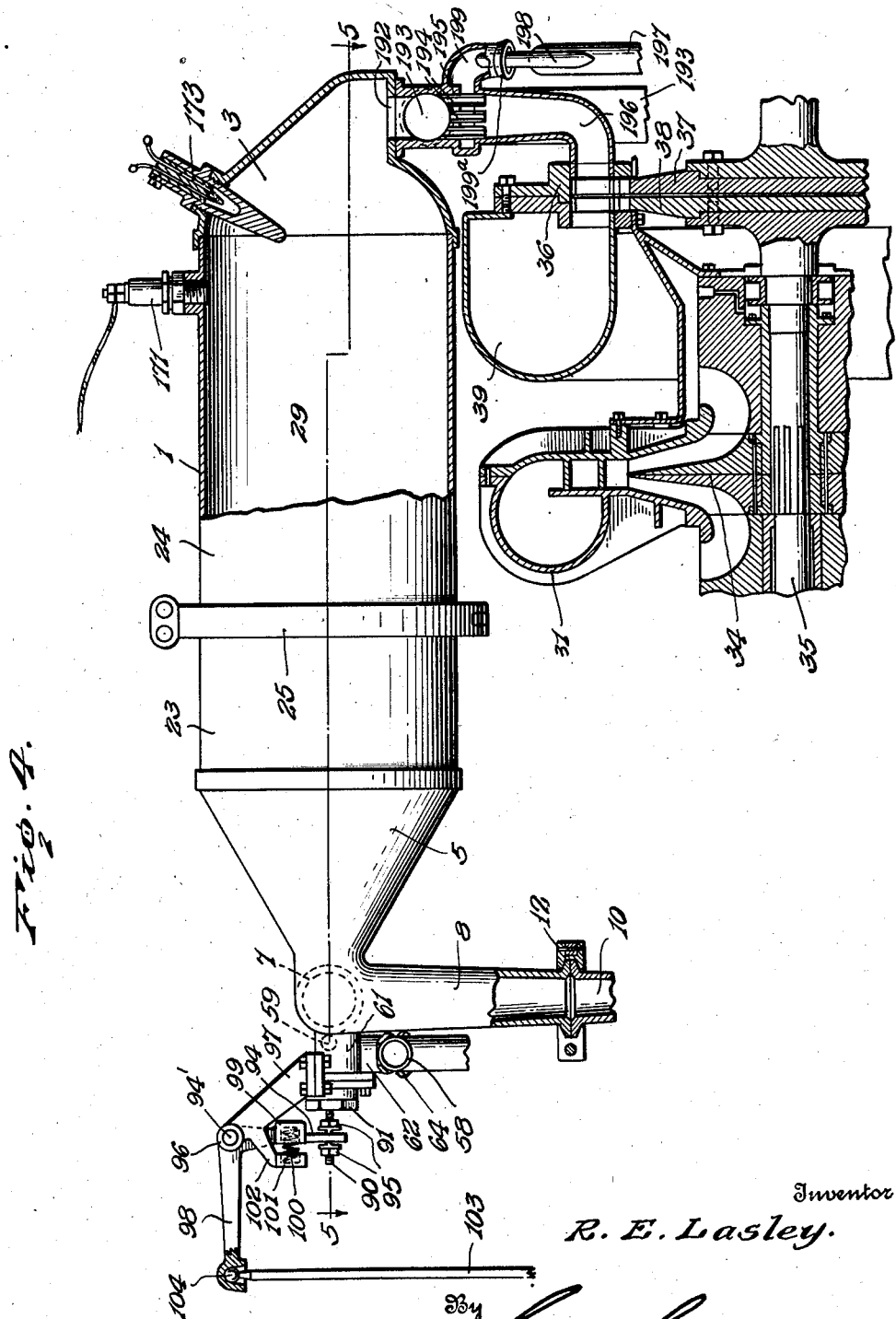

Feb. 17, 1942.   R. E. LASLEY   2,273,406
POWER PLANT
Filed Dec. 15, 1938   5 Sheets-Sheet 5
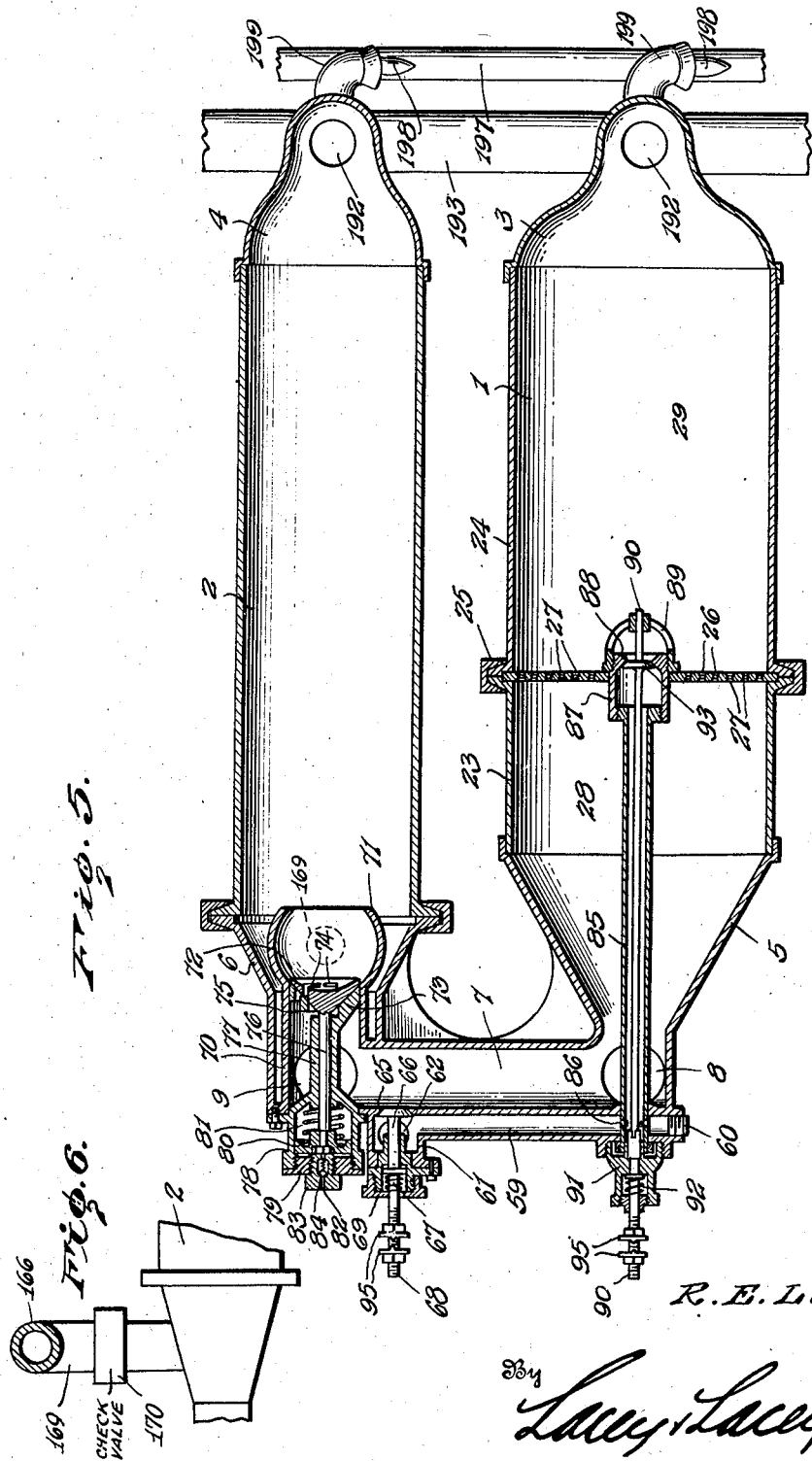

Patented Feb. 17, 1942

2,273,406

UNITED STATES PATENT OFFICE 2,273,406

POWER PLANT

Robert E. Lasley, Waukegan, Ill.

Application December 15, 1938, Serial No. 245,966

7 Claims. (Cl. 60—41)

This invention relates to a power plant of the internal combustion turbine type, and it is one object of the invention to provide a power plant of this character including low and high pressure cylinders, means being provided for delivering air under low pressure into both cylinders and then delivering air from the low pressure cylinders into the high pressure cylinders together with a rich vaporized fuel, the mixture of air and fuel being built up to a very high pressure in the high pressure cylinders, and all of the cylinders having their exhaust ports connected with a turbine casing so that the rotor of the turbine may be driven by the exhausting products of combustion.

It is another object of the invention to provide a power plant of this character wherein the increased pressures built up in the high pressure cylinders will greatly increase the velocity of the products of combustion discharged from the cylinders so that the turbine will be operated in a very efficient manner by the products of combustion which have atmospheric air added to them in order to impart weight and prevent damage to the turbine by overheating.

Another object of the invention is to provide improved means for delivering a rich fuel under pressure into the lower pressure cylinders for mixture with air therein to form a combustible mixture and also to provide improved means for timing explosions in the low and high pressure cylinders and causing the combustible mixture in a low pressure cylinder to be fired and air forced under pressure from the low pressure cylinder into a companion high pressure cylinder together with a rich fuel to mix with air therein and form a combustible mixture which will then be fired.

Another object of the invention is to provide an engine wherein simultaneously with the injection of fuel into the low pressure chamber ignition is applied and the resultant explosion in the combustion chamber of the low pressure cylinder forces air out of the compression chamber formed in the rear half of the cylinder through the connecting passage to the high pressure chamber, carrying the previously deposited fuel spray with it and mixing with air already in the high pressure chamber to form a combustible mixture which is ignited by a spark which is applied at the time of fuel injection and maintained until both low and high compression chambers are fired.

Another object of the invention is to provide a unitary head for the inlet ends of the low and high pressure combustion chambers so arranged as to cause an even flow of air into the respective chambers in such a manner as to prevent turbulence and insure clean scavenging of the chambers, suitable passages being provided for conducting air from a common distributor head to the combustion chambers and from a compression portion of the low pressure chamber to the high pressure chamber, there being also provided a fuel duct common to both the low pressure chamber and the high pressure chamber.

It is another object of the invention to so construct and mount the valve which admits a mixture of air and fuel into the high pressure cylinder that, while it may be quickly moved to an opened position, its closing will be cushioned and shocks prevented which might damage the valve when it is closed.

Another object of the invention is to provide a turbine motor of the internal combustion type which is very efficient in operation and is not liable to get out of order.

The invention is illustrated in the accompanying drawings, wherein:

Figure 1 is a view showing the improved power plant partially in elevation and partially in longitudinal section, Figure 2 is a view looking at the front end of the power plant, Figure 3 is an enlarged sectional view taken longitudinally through the timer and distributor mechanism, Figure 4 is an enlarged view showing the low pressure cylinder and the turbines, the view being partially in elevation and partially in vertical section, Figure 5 is a sectional view taken longitudinally through the low and high pressure cylinders, the view being along the line 5—5 of Figure 2 and Figure 4, Figure 6 is a fragmentary view showing a portion of the high pressure cylinder and a pipe connecting the cylinder with a manifold tube.

This power plant has a plurality of companion low and high pressure cylinders 1 and 2 which are provided at their front ends with heads 3 and 4 and at their rear ends with heads 5 and 6, the heads 5 and 6 of the companion cylinders being connected by a hollow bridge 7 constituting a duct for establishing communication between the rear heads. Necks 8 and 9 extend from the heads 5 and 6 radially of the circular path in which the cylinders of the power plant are disposed and are connected with the short necks 10 of the air distributor head 11 by clamping rings 12. The distributor head 11 is formed at the front end of a cylindrical casing 13, and to the rear end of this distributor casing is secured a sleeve 14 which, together with the forward portion 15 of the casing 16, forms a gear housing. The rear end of the casing 16 is closed by a cap 17, and to this cap is bolted a timer casing 18. Openings 19 establish communication between the head 11 and the necks 10, and in order to control flow of air through the necks 10, each opening 19 has associated with it a valve housing 20 in which operates a valve 21 yieldably held against outward movement to an open position by a spring 22. By providing each opening 19 with a valve, air under low pressure may force its way outwardly through the necks 10 and through the necks 8 and 9 to the cylinders 1 and 2, but air cannot have return movement into the air distributer. As the necks for the companion high and low pressure cylinders are both in valve controlled communication with the distributer head 11, they will be simultaneously filled with air at the pressure under which air is supplied to the low pressure cylinder. The high pressure cylinder defines a combustion chamber extending its full length, but the low pressure cylinder consists of a rear section 23 and a front section 24 which are secured in abutting relation to each other by a clamping ring 25. Between the abutting ends of the cylinder sections 23 and 24 is disposed a diffuser plate 26 formed with a multiplicity of perforations 27 distributed throughout its area and having flaring end portions establishing communication between an air chamber 28 formed by the rear cylinder section 23 and a combustion chamber 29 formed by the forward cylinder section 24.

In order to supply air to the air distributor casing 13, there has been provided a booster compressor 30 and also a main compressor 31. The compressor 30 has its rotor 32 fixed to the power take-off shaft 33 which projects from the forward end of the power plant and the main compressor has its impeller 34 fixed to a shaft 35 disposed in alinement with the power take-off shaft 33 but free from the same. The end portions of the shafts 33 and 35 which are adjacent each other extend into a turbine housing or casing 36, the shaft section 33 carrying a main rotor 37 and the shaft section 35 carrying an auxiliary rotor 38. The rotors are firmly secured to their companion shaft sections by cap screws but are free from each other and each may turn relative to the other. These rotors have their blades so pitched that, when fluid under pressure passes through the turbine casing and acts upon the blades of the two rotors, the power take-off shaft 33 and the impeller 32 of the booster compressor 30 carried thereby will be rotated in one direction and the shaft 35 and the impeller 34 of the main compressor 31 carried thereby turned in an opposite direction. The circular exhaust manifold 39 is secured about its periphery to the peripheral portions of the turbine casing, and from the exhaust manifold projects a discharge neck 40 which extends towards the rear end of the power plant. A duct or air pipe 41 extends from the outlet neck 42 of the booster compressor 30 rearwardly of the power plant and has its rear end bent at an upward incline and secured to one end of the casing of a check valve 43 having a pivoted gate 44 therein which opens rearwardly. The other end of the check valve is secured to the lower neck 45 of a Y coupling 46 which has its upper arm 47 secured to the discharge neck 48 of the main compressor 31. It will thus be seen that the two compressors both communicate with the Y coupling which has its rear end bolted or otherwise firmly secured to an elbow 49 extending downwardly from the rear end portion of the air distributor casing, and adjacent this casing enlarged to form a housing 50 for a shutter valve 51. This shutter valve is mounted upon a rocker shaft 52 journaled through the valve housing 50 and by adjusting the shutter valve proportionate flow of air through the throats 53 and 54 into the air distributer casing may be controlled. A partition 55 is mounted in the distributor casing 13 between the throats or inlets 53 and 54 and is formed with a suitable number of openings 56 through which air entering through the throat 53 may pass to act upon the blades of a turbine rotor 57 and thus impart rotary motion to the shaft 57' upon which the rotor 57 is secured. When the shutter valve is moved to a position to block the throat 53 and only allow air to enter the distributer casing through the throat 54, air will enter the distributer casing without actuating the rotor 57, but when the shutter valve is moved towards the position shown in Figure 3, air will be admitted through the throat 53 and rotary motion will be imparted to the rotor and its shaft, the speed at which the rotor is moved gradually increasing until the highest speed is reached when the shutter valve is in the position shown in Figure 3 and all of the air enters the air distributer casing through the throat 53. As the air in the distributer casing and its head 11 will be under pressure, it will have sufficient force to unseat the valves 21 of the openings 19 and air may flow through the necks 8 and 9 to the low and high pressure cylinders, but as the valves are urged toward a closed position by their springs 22, they will be instantly closed when the fuel charge is ignited in the combustion chambers.

In order to supply fuel to the low and high pressure cylinders, there has been provided a manifold tube 58 which is substantially circular and mounted adjacent the necks 8 and 9 of the cylinders. A tubular chamber or duct 59 extends longitudinally of each bridge or duct 7 and at one end is closed by a plug 60, the other end of the chamber 59 being enlarged to form a valve housing 61 having a neck 62 extending therefrom towards the manifold tube 58 and connected with the companion neck 63 of the manifold tube by a coupling 64 which establishes communication with the valve housing 61. An opening 65 provides communication between the valve housing 61 and the bridge or duct 7, as shown in Figure 5, and this opening is normally closed by a valve 66 yieldably held closed by a spring 67 and having its stem 68 projecting outwardly through the cap 69 of the valve housing. When this valve is opened, a rich fuel will be admitted to the duct 7 adjacent the high pressure cylinder which, together with the duct and the low pressure cylinder, has been previously filled with low pressure air and the fuel mixes with air in the duct to form a fuel mixture which is very rich and will be carried into the high pressure cylinder to mix with air therein and form a combustible mixture under high pressure.

Admission of air or a mixture of air and fuel into the high pressure cylinder takes place through a valve housing 70 which is of tubular formation and within the head 6 of the high pressure cylinder terminates in a nozzle 71 which is of semi-spherical formation and serves to direct a blast of incoming air or fuel mixture into the cylinder longitudinally thereof. The valve head 72 controls flow of fluid through the valve housing and when the valve head is in its closed position against the valve seat 73, the openings or ports 74 will be closed by the ring 75. This valve head has a stem 76 which passes through a guide sleeve 77 and extends into a cylinder 78 which is closed at its outer end by a plug 79. A piston 80 is carried by the valve stem within the cylinder and engaged by a spring 81 which yieldably holds the valve head in its closed position but permits the valve to be shifted to an opened position by the low pressure air or the fuel mixture. The piston 80 is slid longitudinally in the cylinder when the valve is moved in an opening direction and air will be drawn into the cylinder through the port 82 of a nipple 83 and incoming air will be trapped in the cylinder by the inwardly opening check valve 84 to form an air cushion which will check closing movement of the valve 72 and absorb the shock during closing of the valve which is rapidly moved to a closed position by the force of an explosion in the high pressure cylinder.

Passage of fuel from the duct or chamber 59 into the combustion chamber 29 of the low pressure cylinder takes place through a tube 85 which extends longitudinally in the rear air chamber thereof and has its rear end portion secured through the duct 59 and formed with perforations 86 to admit the fuel into the tube 85. The forward end portion of this tube 85 is secured in a valve housing 87 mounted centrally of the diffuser plate and extending through the same with its forward end portion projecting into the combustion chamber 29 and inwardly thickened, as shown at 88, to form a valve seat and spray head. A guide 89 for the forward end portion of a valve stem 90 is carried by the protruding forward end portion of the valve casing 87 and prevents movement of the valve stem out of its position axially of the tube 85. The rear end portion of the valve stem passes through a hood 91 and is acted upon by a spring 92 which urges the valve stem inwardly and yieldably holds the valve head 93 in its closed position against the valve seat. It will thus be seen that the valve will be normally held closed but may be moved to an opened position when the rich fuel mixture is to be admitted into the combustion chamber of the low pressure cylinder.

The valves 66 and 93 of each pair of companion low and high pressure cylinders are to be simultaneously opened, and in order to do so, they are engaged by the arms 94 which are carried by a rocker shaft 94' and engage about the outer end portions of the valve stems 68 and 90 between the nuts 95 carried by the valve stems. The rocker shaft 94' is rotatably mounted through the bearings 96 of a bearing bracket 97, and between the arms of the bearing bracket the rocker shaft carries a lever 98 of the bell crank type which has its inner arm formed with a cup or socket 99 to receive one end portion of a spring 100. This spring has its outer end engaged in a cup or socket 101 carried by a yoke or bridge 102 extending from the arms of the bearing bracket, and tension of the spring will serve to urge the inner arm of the bell crank lever forwardly and likewise the arms 94 so that the valves 66 and 93 will be yieldably held closed. A rod or link 103 is connected with each bell crank lever 98 by a ball and socket joint 104, and at its inner end each rod or lift rod is connected with a push rod 103' slidably engaged through a guide sleeve 105. The guide sleeves 105 extend through the annular wall of the distributer casing 16 and at its inner end each push rod carries a roller 106 for engagement by the lug 107 of the cam disk 108 during rotation of the cam disk. This cam disk is carried by a shaft 109 which may be referred to as a cam shaft and is provided with ribs 110 serving to cause a cam disk to turn with the cam shaft while at the same time permitting the cam disk to be shifted longitudinally of the cam shaft to adjusted positions thereon. From an inspection of Figure 10, it will be seen that the width of the lug, or in other words, the distance it extends circumferentially of the cam disk, gradually increases from one of its ends to its other end, and it will be readily apparent that by shifting the cam disk along the cam shaft the length of time a push rod will be held outwardly as it passes over the lug may be controlled. Outward movement of a push rod acts upon the companion lift rod to move the fuel inlet valve of the companion low and high pressure cylinders to an open position, and by shifting the cam disk along the cam shaft the length of time the valves remain in an open position may be controlled. The cam shaft is journaled through the partition 111 of the fuel distributer casing 16 and connected by a train of gearing 112 to the rear end of the turbine shaft 58, as shown in Figure 3, and referring to this figure, it will be seen that, when the shaft 58 is rotated by action of air upon the blades of the turbine 57, rotary motion will be transmitted to the cam shaft and the push rod successively moved outwardly to open the fuel inlet valve of each pair of low and high pressure cylinders in proper timed relation to feeding of air to these cylinders.

The shutter valve and the cam disks are to be simultaneously adjusted so that the speed at which the fuel inlet valves open and close will be properly timed according to flow of air through the air distributer to the low and high pressure cylinders and the exploding of the combustible mixture in the cylinders. In order that this adjustment of the cam disks may be carried out, there has been provided an adjusting shaft or rocker shaft 113 which is rotatably mounted in the rear portion of the timer casing through a bearing 114 carried by the cap or head 17. At its inner end the shaft 113 carries a cam disk 115, and since this cam disk is disposed between the cam 108 and the collar 116 at the outer end of the neck 117, turning of the shaft 113 will cause the cam disk 108 to be shifted along the cam shaft 109. A lever arm 118 extends laterally from the outer end of the shaft 113, and at its outer end is slotted longitudinally to pivotally and slidably receive a pin or the like connecting the lever with the pitman rod or link 119 which extends forwardly from the lever 118 and at its front end pivoted to a rocker arm 120 carried by the shaft 52 of the shutter valve. This rocker arm or bell crank lever is pivoted at its lower end to a rocker arm 121 which is pivoted intermediate its length to a bracket 122 carried by the valve housing 50, as shown in Figure 2, and the lower end of the rocker arm 121 is pivoted to a link 123 which extends rearwardly and at its rear end is connected to a lever 124. The lever 124 is pivotally mounted intermediate its length to the body or casing 125 of a pressure regulator carried by the elbow 49, and the outer or free end portion of the lever 124 extends across the stem 126 of a piston 127 operating within the cylindrical interior of the pressure regulator body. This pressure regulator is secured to the neck 128 extending from the elbow and perforations 129 are formed in the elbow in order that air passing through this elbow may enter the neck and act upon the piston to force it outwardly against the action of the spring 130 to rock the lever and impart adjusting movement to the shutter valve 51 and the cam disk 108. The shutter valve and the cam will thus be simultaneously adjusted and the speed at which the fuel inlet valves are opened and the duration of their retention in an opened position controlled in accordance with the speed at which the engine is operating. An oil inlet 125' of conventional formation is mounted through the casing 125 to permit lubrication of the piston 127 when necessary.

Fuel for the power plant is obtained from a suitable source of supply, such as a storage tank, not shown, through a pipe line 131 having a portion 132 extending to a float controlled fuel injector 135 of a conventional construction with which pipes 135' and 136 are connected. The pipe or tube 135' leads from a high pressure air tank 137 with which it is connected by a control valve 138, and the pipe or tube 136 is connected with a tube 158 which leads to a throttle valve 159 connected with the manifold 58 by a tube 160 and associated coupling.

In order that a supply of air under high pressure may be initially built up in the high pressure air tank 137, there has been provided a manually operated pump 164 which is connected with the air tank by means of a manually operated valve 165 intended to be opened when pumping air into the tank and then closed. The supply of compressed air is to be maintained in the air tank during operation of the power plant, and in order to do so, there has been provided a manifold tube 166 which is substantially circular and is disposed forwardly of the necks 8 and 9 and surrounded by rear end portions of the cylinders. A short pipe 167 leads from one end of the manifold pipe or tube 166 and is connected with the forward end portion of the air tank by means of a manually controlled valve 168 which may be referred to as a header valve. The rear heads 6 of the high pressure cylinders are each connected with the manifold tube 166 by short pipes 169 having check valves 170 mounted therein, and since these check valves open toward the manifold pipe or tube, air under pressure may be forced through them and into the manifold tube but cannot have return movement. It will thus be seen that, when the power plant is in operation and explosions occur in the high pressure cylinders, air will be forced into the manifold tube 166, and from this tube through the pipe 167 and valve 168 into the storage tank to maintain a supply of air under high pressure in this tank.

In order to ignite and explode the combustible mixture in the low and high pressure cylinders, there have been provided spark plugs 171 and 172, and if so desired, there may also be provided hot point ignition devices 173 for the low pressure cylinders and also for the high pressure cylinders if found necessary. Conductors 174 and 175 lead from the spark plugs 171 and 172 of the low and high pressure cylinders and the conductor wires of the spark plugs for each set of companion low and high pressure cylinders are secured to one of the terminals or distributor points 176 which project radially from the distributer casing 18. Companion terminals 177 extend from the distributer casing in rearward spaced relation to the terminals or distributer points 176, and each of the terminals 177 has attached to it a conductor wire 178 leading to the ignition coil 179. A second wire 180 extends from the ignition coil and is connected with the terminal 181 of a conductor ring 182 mounted in the rear portion of the distributer casing and engaged by the roller 183 of a contact arm 184 carried by a sleeve 185 which fits about a tube or sleeve 186 carried by and turning with the rear portion of the distributer shaft 109. This tube or sleeve 186 also carries a block of insulating material 187 upon which are secured bridging strips 188 for establishing electrical communication between the companion terminals or distributer points 176 and 177. In view of the fact that the distributer for the ignition and the distributer for the fuel are both operated from the rotary distributer shaft 109, the feeding of the fuel and the firing thereof in the cylinders will be in proper timed relation. A conventional ignition switch 189 is provided for engaging the switch point 190 and closing the circuit for the ignition mechanism, this switch point being connected with the source of power by a conductor wire 191.

When an explosion takes place, the products of combustion rush from the low and high pressure cylinders through the outlets 192 thereof into the annular exhaust manifold 193, and from this manifold through the tube 194 of the multi-jet nozzles 195 into the Venturi throat 196. One of these throats leads from each of the multi-jet nozzles and the Venturi throats open into the turbine casing 36 so that the blades of the turbine rotors 37 and 38 will be acted upon and the turbine rotor 37 and power take-off shaft 33 turned in one direction while the turbine rotor 38 and the shaft 35 are turned in an opposite direction. It is desired to have air mixed with the products of combustion in order to impart added weight and also cool the products of combustion sufficiently to prevent damage to the blades of the turbine rotor by over-heating. This air is mainly obtained by drawing atmospheric air through the inlet 199 which is open to the atmosphere, admitting air around the multi-jet nozzles 195, as shown in Figure 4. The inlet 199 is provided with an entrance 199ª substantially in the form of a venturi. To augment the entraining of air through the Venturi opening 199ª. the air pipe 197 has been provided. Upon referring to Figure 1, it will be seen that the air pipe 197 has one end connected with the duct 41 leading from the booster compressor. Air nozzles 198 lead from the air pipe or tube 197 and each extends into the companion air inlet throat 199ª. Air from these jets serves to boost the supply of air entering around the multi-jet nozzles 195 in such relation to the tubes or jets 194 that the stream of products of combustion will be surrounded by the incoming air. The discharging products of combustion from the jets 194 set up a suction through the inlets 199 which will tend to draw the air into the main Venturi throats 199ª. The air and the products of combustion become thoroughly mixed as they pass through the Venturi throat and when delivered into the turbine casing serve very effectively to turn the rotor.

Efficiency refers to the impact of fluid on the blades. Constant equal pressure on all blades increases the efficiency because there is no moment when there is a higher pressure on certain of the blades, which tends to force the rotor momentarily to a speed which would render the slower moving fluid at lower pressure ineffective on the other blades.

When this power plant is in use, it is initially started through the medium of an electric motor 211 which extends longitudinally of the motor back of the main compressor to which it is secured, as shown in Figure 1. A clutch 212 is mounted between the shaft of the electric motor and the shaft 35 carrying the impeller 34 of the main compressor, and in order to operate this clutch, there has been provided a lever 213 pivoted to the casing of the electric motor and normally held in a released position by a spring 214. When the clutch lever is moved in a direction to engage the clutch and permit the shaft 35 to be rotated from the electric motor, the starter switch 215 disposed in the conductor wire 216 leading from the switch point 190 to the electric motor will be closed and the electric motor set in operation. The main compressor will thus be set in operation and air forced through the branch 47 of the Y coupling 46 and through the elbow 49 into the air distributer from which it will flow through the necks 8 and 9 into the low and high pressure cylinders. The air will actuate the turbine 57 during its flow into and through the air distributer, and the push rod and lift rod will be actuated to open the valve for admitting charges of fuel into the low pressure cylinder and into the bridge or duct leading to the high pressure cylinder. It is necessary when initially setting the power plant in operation to build up a supply of air under pressure in the air tank 137. Therefore, the valve 165 is opened and the pump 164 operated to force air into the air tank, and when the valve 138 opens air may flow through the pipe 135' to the injector 135 where fuel is injected into the air stream and the resulting rich mixture of air and fuel will flow through the pipes 136 and 158 into the fuel manifold and to the valve controlling admission of the fuel into the low pressure cylinder and the duct 7. When an explosion occurs in the explosion chamber 29 of the low pressure cylinder, the products of combustion will act through the perforations of the diffuser plate and air in the rear chamber 28 will be forced at high pressure from this air chamber and through the duct 7 to force the valve 72 to an opened position and enter the high pressure cylinder as a rich fuel mixture which mixes with the air in the high pressure cylinder and forms a combustible mixture which is then exploded by spark plug 172. The products of combustion are carried out of the high pressure cylinder by the incoming charge of air. The force of an explosion will force air through the connections 169 and their check valves 170 into the air tube or manifold 166, and from this tube through the pipe 167 and the valve 168 into the air tank. Therefore, the supply of air under high pressure will be maintained in the air tank. After the engine has been started, the clutch lever may be returned to its initial position to release the shaft 35 from the electric motor and since the switch 215 will be opened by this movement of the clutch lever the motor will be shut off. The hot exhaust gases together with entrained air are delivered to the turbine casing 36 and operate the turbine rotors 37 and 38 to impart motion to the impellers 32 and 34 for the booster compressor and the main compressor and air will be forced from these compressors to the air distributor. Let it be assumed that the main power turbine 37 carried by the power take-off shaft 33 has a heavy load to start with, which it cannot pull until the motive fluid is supplied in greater quantity and at a much higher pressure than is available on initial starting, the main turbine rotor 37 will not move when the initial explosions take place. Since the main rotor 37 is not rotating at this period, it will not absorb any energy from the motive fluid. The auxiliary turbine rotor 38, having no load until it has picked up speed, easily rotates from the impact of the motive fluid and uses all available energy to gain speed. As it gains speed, it drives the main blower or compressor 34 and supplies air to the combustion chambers at a rapidly increasing pressure. As soon as the pressure is sufficient to drive the main rotor, it picks up the load, and as the main turbine rotor 37 increases its speed, it absorbs the increased energy supplied by the increased pressure of the motive fluid. The more the load tends to retard the speed of the main turbine 37, the more energy will be passed onto the auxiliary turbine 38 to increase the speed and raise the pressure needed to drive the main turbine. It will thus be seen that the power take-off shaft and the booster compressor 32 carried thereby will be operated by the main turbine 37 and that the main compressor 34 carried by the shaft 35 is operated by the auxiliary rotor 38, the two shafts 33 and 35 being turned in opposite directions and the two blowers or compressors cooperating with each other to supply air to the combustion chambers at the necessary speed and pressure. The products of combustion after imparting motion to the rotors 37 and 38 enter the exhaust manifold 39, and from this manifold flow through the exhaust pipe. The air flowing from the air tank through the pipes 135' and 136 takes up fuel from the fuel injector 135. It will thus be seen that a supply of air under pressure is maintained in the air tank. When the throttle valve is adjusted to control flow of fuel to the fuel manifold, the shutter valve 51 will be simultaneously adjusted to control the quantity of air passing through the passage 53 and acting upon the rotor 57. It will thus be seen that the valve and the ignition timer will be operated in proper timed relation to the flow of air. Also the cam 107 will be shifted along the shaft 109 during adjustment of the shutter valve and the valve for admitting fuel to the cylinders will be held open the correct length of time according to the speed at which the power plant is running. When it is desired to stop the power plant, the control valve 138 and the header valve 168 are closed so that a supply of air under pressure will be held in the air tank and since the throttle valve will, of course, be closed a supply of vaporized fuel will be held in the vapor reservoir. The ignition switch will be opened and since the ignition will be shut off and flow of air and fuel to the cylinders stopped operation of the power plant will be brought to a stop.

Having thus described the invention, what is claimed as new is:

1. In a power plant, low and high pressure cylinders, a perforated partition in the low pressure cylinder dividing the same into a front combustion chamber and a rear air chamber, a duct connecting the rear ends of said cylinders for passage of air from the low pressure cylinder into the high pressure cylinder, means for delivering air under low pressure into said cylinders through end portions of said duct, a fuel passage extending longitudinally of said duct, a valve for controlling flow of fuel from said passage into said duct adjacent the high pressure cylinder having an outwardly extending stem, the valve when opened admitting fuel into the duct to mix with air therein and form a rich fuel mixture, a valve mounted through said partition and having a fuel tube extending to said fuel passage and a valve stem extending through said tube and projecting from the fuel passage, means for simultaneously actuating said valves to open the same for delivery of fuel into the front combustion chamber of the low pressure cylinder to mix with air and form a combustible mixture and into said duct adjacent the high pressure cylinder to mix with air and form a rich fuel mixture, means for exploding the combustible mixture in the front chamber of the low pressure cylinder and create force to act upon air in its rear chamber and drive air and fuel through the duct and into the high pressure cylinder to mix with air therein and form a combustible mixture under high pressure, a check valve between the high pressure cylinder and the duct opening towards the high pressure cylinder and having a nozzle for directing air and fuel passing into the cylinder, means to explode the combustible mixture in the high pressure cylinder, a turbine, and means for delivering products of combustion from the cylinders to the turbine to rotate the rotor thereof.

2. In a power plant, low and high pressure cylinders, a perforated partition in the low pressure cylinder dividing the same into a front combustion chamber and a rear air chamber, a duct connecting the rear ends of said cylinders for flow of air from the rear chamber of the low pressure cylinder into the high pressure cylinder, means for delivering air into said cylinders through end portions of said duct, a fuel passage extending longitudinally of said duct, a valve for controlling flow of fuel from said passage into said duct to mix with air in the duct and form a rich fuel mixture, valve controlled means for delivering fuel from said fuel passage into the front combustion chamber of the low pressure cylinder to mix with air therein and form a combustible mixture, means for exploding the combustible mixture in the front chamber of the low pressure cylinder and create force to drive air from the rear chamber and force the mixture of air and fuel through the duct and into the high pressure cylinder to mix with air therein and form a combustible mixture under high pressure, a check valve for controlling flow of air and fuel into the high pressure cylinder disposed at the rear end thereof and opening towards the high pressure cylinder, means to explode the combustible mixture in the high pressure cylinder, a turbine, and means for delivering products of combustion from the cylinders to the turbine to rotate the rotor thereof.

3. In a power plant, low and high pressure cylinders, a perforated partition dividing the low pressure cylinder into front and rear chambers, a conduit connected with said cylinders to establish communication between the rear ends of the cylinders whereby air under pressure may be forced from the rear chamber of the low pressure cylinder through the conduit and into the high pressure cylinder through the rear end thereof to build up high pressure therein, said conduit having air inlet means to supply air under low pressure to said cylinders, valve controlled means for admitting fuel into said conduit to mix with air therein and form a rich fueling the combustible mixture in the front chamber of the low pressure cylinder to mix with air and form a combustible mixture, means for firing the combustible mixture in the front chamber of the low pressure cylinder and create force to drive air from the rear chamber thereof into the conduit and force the rich fuel mixture into the high pressure cylinder to mix with air therein and form a combustible mixture under high pressure, a valve for controlling communication between the conduit and the high pressure cylinder yieldably held closed and adapted to open in the direction of the high pressure cylinder, means for directing flow of the rich fuel mixture longitudinally into the high pressure cylinder when the valve is opened, means to explode the combustible mixture in the high pressure cylinder, a turbine, and means for delivering products of combustion from the cylinders to the turbine to rotate the rotor thereof.

4. In a power plant, low and high pressure cylinders, a perforated partition dividing the lower pressure cylinder into front and rear chambers, a conduit connected with said cylinders to establish communication between the rear ends of the cylinders whereby air under pressure may be forced from the rear chamber of the low pressure cylinder through the conduit and into the high pressure cylinder through the rear end thereof to build up high pressure therein, said conduit having air inlet means to supply air under low pressure to the cylinders, valve controlled means for admitting fuel into said conduit to mix with air therein and form a rich fuel mixture and into the front chamber of the low pressure cylinder to form a combustible mixture therein, means for firing the combustible mixture in the front chamber of the low pressure cylinder to create force for driving air from the rear chamber of the low pressure cylinder and through the conduit to force the rich fuel mixture therein into the high pressure cylinder to mix with air therein and form a combustible mixture under high pressure, a valve seat in said conduit adjacent the high pressure cylinder, a valve yieldably held seated upon said valve seat and adapted to open towards the high pressure cylinder, cushioning means associated with said valve, and a semi-spherical member about the valve seat and the valve for directing rich fuel mixture longitudinally into the high pressure cylinder when the valve is opened, means to explode the combustible mixture in the high pressure cylinder, a turbine, and means for delivering products of combustion from the cylinders to the turbine to rotate the rotor thereof.

5. In a power plant, low and high pressure cylinders, a perforated partition dividing the low pressure cylinder into front and rear chambers, a conduit extending between said cylinders to establish communication between the rear ends of the cylinders, said conduit having a neck at one end secured about the inlet end of the high pressure cylinder, said conduit having air inlet means to supply air under low pressure to the cylinders and a valve controlled fuel inlet adjacent the neck for admitting fuel to mix with air in the conduit and form a rich fuel mixture, means for delivering fuel into the front chamber of the low pressure cylinder to mix with air therein and form a combustible mixture, means for firing the combustible mixture in the front chamber of the low pressure cylinder to create force for driving air from the rear chamber through the conduit and force the rich fuel mixture into the high pressure cylinder to mix with air and form a combustible mixture, a valve operating in said neck and adapted to open towards the high pressure cylinder, cushioning means for checking closing movements of the valve, a spring yieldably holding the valve closed, means for directing flow of the rich fuel mixture from the valve longitudinally into the high pressure cylinder, means to explode the combustible mixture in the high pressure cylinder, a turbine, and means for delivering products of combustion from the cylinders to the turbine to rotate the rotor thereof.

6. In a power plant, low and high pressure cylinders, a perforated partition dividing the low pressure cylinder into front and rear chambers, a conduit extending between said cylinders to establish communication between the rear ends of the cylinders and having a neck at one end secured about the inlet end of the high pressure cylinder, said conduit having air inlet means to supply air under low pressure to the cylinders and a valve controlled fuel inlet adjacent the neck for flow of fuel into the conduit to mix with air therein and form a rich fuel mixture, means for delivering fuel into the front chamber of the low pressure cylinder to mix with air therein and form a combustible mixture, means for firing the combustible mixture in the front chamber of the low pressure cylinder to create force for driving air from the rear chamber through the conduit to force the rich fuel mixture from the conduit into the high pressure cylinder to mix with air therein and form a combustible mixture under high pressure, a valve seat in said neck, a cylindrical chamber at the outer end of said neck, a sleeve extending through said neck axially thereof between the chamber and the valve seat, a head closing the outer end of said chamber, an inwardly opening check valve carried by the head for admitting air into said chamber, a valve head seating against the valve seat when closed and opening towards the high pressure cylinder, a stem for the valve head slidable through said sleeve and extending into said chamber, a piston carried by said stem within the chamber and slidable longitudinally in the chamber, a spring in said chamber exerting pressure upon the piston to yieldably hold the valve head in its closed position against the valve seat, air admitted through the check valve into the chamber serving to cushion closing of the valve head, means for exploding the combustible mixture in the high pressure cylinder, a turbine, and means for delivering products of combustion from the cylinders to the turbine to rotate the rotor thereof.

7. In a power plant, low and high pressure cylinders, a perforated partition dividing the low pressure cylinder into front and rear chambers, a conduit extending between said cylinders to establish communication between the rear ends of the cylinders and having a neck at one end secured about the inlet end of the high pressure cylinder, said conduit having air inlet means to supply air under low pressure to the cylinders and a valve controlled fuel inlet adjacent the neck for admission of fuel into the conduit to mix with air therein and form a rich fuel mixture, means for delivering fuel into the front chamber of the low pressure cylinder to mix with air therein and form a combustible mixture, means for firing the combustible mixture in the front chamber of the low pressure cylinder and create force for driving air from the rear chamber through the conduit to force the rich fuel mixture from the conduit into the high pressure cylinder to mix with air therein and form a combustible mixture under high pressure, a valve seat in said neck adjacent the inlet end of the high pressure cylinder, a cylindrical chamber at the opposite end of the neck having an air inlet, an inwardly opening check valve for the air inlet of the chamber, a valve head seating against said valve seat and movable towards the high pressure cylinder to an opened position, a stem extending from the valve head longitudinally through the neck and into said chamber, a piston slidable longitudinally in said chamber and secured upon said stem, a spring yieldably holding said valve head in its closed position against the valve seat, air admitted through the check valve into the chamber serving to cushion closing of the valve head, a semi-spherical member surrounding the valve seat and the valve head for directing rich fuel mixture longitudinally into the high pressure cylinder when the valve head is opened, means for exploding the combustible mixture in the high pressure cylinder, a turbine, and means for delivering products of combustion from the cylinders to the turbine to rotate the rotor thereof.

ROBERT E. LASLEY.